United States Patent [19]

Ninomiya et al.

[11] 4,210,628

[45] Jul. 1, 1980

[54] REMOVAL OF NITROGEN OXIDES

[75] Inventors: Nobutaka Ninomiya, Kyoto; Hiroshi Nishino; Toshio Aibe, both of Osaka; Kiyoshi Itoga, Hyogo, all of Japan

[73] Assignee: Takeda Chemical Industries, Ltd., Osaka, Japan

[21] Appl. No.: 1,196

[22] Filed: Jan. 5, 1979

Related U.S. Application Data

[63] Continuation of Ser. No. 487,801, Jul. 11, 1974, abandoned.

[30] Foreign Application Priority Data

Jul. 12, 1973 [JP] Japan .................................. 48-78980
Sep. 21, 1973 [JP] Japan ................................ 48-107170
Dec. 20, 1973 [JP] Japan ................................ 48-143174

[51] Int. Cl.$^2$ ............................................. B01D 53/39
[52] U.S. Cl. .................................................... 423/239
[58] Field of Search ................... 423/235, 239, 213.2; 55/65, 74; 252/423, 428

[56] References Cited

U.S. PATENT DOCUMENTS

| | | | |
|---|---|---|---|
| 3,008,796 | 11/1961 | Anderson | 423/235 |
| 3,502,427 | 3/1970 | Johswich | 423/244 |
| 3,778,387 | 12/1973 | Urbanic et al. | 252/428 |
| 3,795,730 | 5/1974 | Kalvinskas | 423/239 |
| 3,803,804 | 4/1974 | Arashi et al. | 423/244 |
| 3,887,683 | 6/1975 | Abe et al. | 423/239 |
| 3,895,094 | 7/1975 | Carter | 423/239 |

FOREIGN PATENT DOCUMENTS 1504331 10/1967 France ...................................... 423/239

*Primary Examiner*—G. O. Peters
*Attorney, Agent, or Firm*—Wenderoth, Lind & Ponack

[57] ABSTRACT

Nitrogen oxides contained in waste gases can be effectively removed from waste gases by a novel process which comprises contacting the waste gases with activated carbon in the presence of gaseous ammonia at a temperature between about 110° C. and about 350° C. to convert the nitrogen oxides to nitrogen. When waste gases containing sulfur oxides together with nitrogen oxides are subjected to this process, both the nitrogen oxides and the sulfur oxides can be simultaneously removed from the waste gases with a high efficiency. The effects of this process can be enhanced by employing a specific element-supporting activated carbon or an oxidized activated carbon.

4 Claims, No Drawings

REMOVAL OF NITROGEN OXIDES

CROSS-REFERENCE TO RELATED APPLICATIONS

The present application is a continuation of application Ser. No. 487,801, filed July 11, 1974.

DESCRIPTION OF THE PRIOR ART

The present invention relates to a process for treating a nitrogen oxide-containing waste gas.

In recent years atmospheric pollutions due to the nitrogen oxides (e.g. NO and $NO_2$) contained in waste gases from such industrial installations as steam power plants, chemical plants, metal refineries and metal washing plants have become a major social concern and a strong demand exists for the development and reduction to practice of a process capable of removing nitrogen oxides from such waste gases with a high efficiency. Furthermore, since the nitrogen oxides are usually contained together with sulfur oxides (e.g. $SO_2$ and $SO_3$) in the waste gases, a strong demand exists for the development and commercial adpatation of a process capable of removing nitrogen oxides and sulfur oxides in a single operation.

The processes hitherto known for the removal of nitrogen oxides are divided into four groups, i.e. (1) an absorption process which involves the use of water or an aqueous alkali solution, (2) a catalytic decomposition process which depends upon, for example, a copper catalyst, (3) a catalytic decomposition-reduction process which involves the use of, for example, a platinum catalyst, and (4) an adsorption process which employs an adsorbent such as silica gel, zeolite or activated carbon.

However, the above-mentioned absorption process (1) has substantially no effect upon NO, besides presenting problems in connection with the treatment of waste liquors after the absorption treatment, for instance. The catalytic decomposition process (2) entails a marked increase in activity of the catalyst due to the concomitant presence of $O_2$ and $SO_2$, and obligates one to employ a high reaction temperature of not lower than about 500° C. The catalytic reduction process (3) in which the nitrogen oxide is reduced to nitrogen with a reducing gas such as hydrogen, carbon monoxide or a hydrocarbon has the disadvantage that $O_2$, if present, reacts with such reducing gas in the first place to consume the latter and the resultant heat of reaction tends to cause a sharp increase in the gas temperature which, in turn, reduces the activity of the catalyst due, for example, to the sintering thereof. Moreover, when sulfur oxides are contained together with nitrogen oxides in the waste gas, the catalyst is significantly poisoned by the sulfur oxides. The adsorption process (4) is accompanied by such drawbacks that the adsorptive capacity of the adsorbent for nitrogen oxide is not sufficiently high and especially in the case of silica gel or zeolite, its adsorptive capacity is considerably reduced by water vapor which may be contained in the gas. To regenerate the adsorbent, the nitrogen oxide adsorbed must be desorbed and the gas or liquid containing the nitrogen oxide thus removed presents treatment problems. Furthermore, as the adsorption-desorption cycle is repeated, the adsorptive capacity of the adsorbent for nitrogen oxide is significantly lowered with time.

On the other hand, there has been known the process involving the use of activated carbon for removal of sulfur oxide from waste gases, but when nitrogen oxide occurs as well in the waste gases, the speed at which the activated carbon eliminates the sulfur oxide is markedly reduced.

SUMMARY OF THE PRESENT INVENTION

Under the circumstances the present inventors conducted extensive research and have unexpectedly found that when gaseous ammonia is introduced into a nitrogen oxide-containing waste gas and the resultant mixture is contacted with activated carbon at about 110° C. to about 350° C., the nitrogen oxide is successfully reduced to nitrogen which is harmless, and that, in this operation, the presence of oxygen in the waste gas results in an increased reductive activity for the conversion of nitrogen oxide into nitrogen. It has been also found that while activated carbon, as such, is sufficiently catalytically active for the reduction of nitrogen oxide to nitrogen in the above-mentioned operation, the catalytic activity of activated carbon is significantly increased when it supports one or more of the specific elements of Ti, Cr, Mn, Fe, Co, Ni, Cu, V, Mo and W, and/or it has been previously oxidized. Furthermore, it has been also found that when a waste gas containing sulfur oxide together with nitrogen oxide is subjected to the above-mentioned operation, sulfur oxide is converted into and adsorbed as sulfuric acid and/or ammonium sulfate on the activated carbon simultaneously with the reduction of nitrogen oxide to nitrogen, thereby, both the nitrogen oxide and sulfur oxide can be removed from the waste gases in a single operation.

The present invention has been accomplished on the basis of said findings, and its principal object is to provide a novel and industrially feasible process for removing nitrogen oxide with a high efficiency from a nitrogen oxide-containing waste gas. Another object is to provide a novel and excellent process for removing both nitrogen oxide and sulfur oxide from waste gases containing them in a single and simple operation.

DESCRIPTION OF THE PREFERRED EMBODIMENTS

In the process of the present invention, nitrogen oxide can be removed from a nitrogen oxide-containing waste gas by contacting the nitrogen oxide-containing waste gas with activated carbon in the presence of gaseous ammonia to reduce the nitrogen oxide to nitrogen. The nitrogen oxide-containing waste gas may be any of those containing NO, $NO_2$, $N_2O$, $N_2O_5$ and mixtures thereof. More particularly, the waste gas to be treated according to the present invention may be any of the waste gases containing such nitrogen oxide, such as the boiler flue gases from steam power plants and other plants and the various waste gases from such industrial installations as chemical plants, metal refining plants and metal washing plants. These waste gases may also contain sulfur oxide such as sulfur dioxide, sulfur trioxide and mixtures thereof together with nitrogen oxide.

Such a nitrogen oxide-containing waste gas is contacted with activated carbon in the presence of gaseous ammonia. The specific treating procedures are optional, and the specific procedure which is advantageous comprises previously admixing gaseous ammonia into the waste gas and then contacting the resultant gaseous mixture with activated carbon, while use may also be made of other procedures, one which comprises permitting the waste gas and gaseous ammonia simultaneously to flow in contact with activated carbon. The advantageous proportion of gaseous ammonia is not less than about ⅔ mole and, for still better results, about 1 to about 50 moles, per mole of nitrogen oxide (in terms of NO) contained in the waste gas. The gaseous ammonia may be admixed into the waste gas after being diluted with a gaseous diluent such as air, nitrogen or carbon dioxide gas before it is admixed into the waste gas. Particularly when the waste gas is free from oxygen, it is desirable to dilute gaseous ammonia with air so as to give oxygen of not less than about 0.5 mole per mole, in terms of NO, of the nitrogen oxide in the gas to be contacted with activated carbon.

The activated carbon to be employed in the process of the present invention may be any of the activated carbons which are based on such known materials as charcoal, coal, coke and coconut shell and have been activated by conventional activation procedures. It is advantageous to employ those activated carbons having the surface area of between about 200 m$^2$/g. and 2,000 m$^2$/g., especially of between about 600 m$^2$/g. and about 1,200 m$^2$/g. These activated carbons may be employed in an optional shape such as granular, crushed or powdery form.

While the process of the present invention can give rise to excellent results with the use of these conventional activated carbons, significantly improved results can be attained with the employment of the activated carbon which supports thereon one or more of the particular elements, i.e. Ti, Cr, Mn, Fe, Co, Ni, Cu, V, Mo and W, and/or has been previously oxidized.

One or a mixture of the above-mentioned optional elements may be supported predominantly in the form of the metal as such or in the form of the corresponding metal oxide on the activated carbon. The activated carbon supporting such an element or elements may be prepared by a per se established manner, for example (1) the process comprising compounding a material carbon with a compound of the corresponding metal such as a water- or solvent-soluble salt, e.g. nitrate or ammonium salt, of the metal or a solvent-insoluble oxide or salt of the metal and then, carbonizing the compounded material and activating the same in a per se established manner, or (2) the process which comprises dissolving said metal compound in water or an organic solvent, impregnating or spraying activated carbon with the resultant solution and drying the same under heating at a temperature between about 60° C. and about 200° C. If desired, thus-treated carbon may be further calcined at a temperature between about 110° C. and 850° C. in a suitable atmospheric gas such as an inert gas (e.g. nitrogen, carbon dioxide etc.), an oxidizing gas (e.g. air, steam etc.) or the like. The amount of such element supported on the activated carbon is usually not less than about 0.0001 and, preferably about 0.001 to about 0.2 part by weight in terms of the corresponding metal or metals per part by weight of the activated carbon. From the practical viewpoints, most advantageous amount of such element falls within a range from about 0.001 to about 0.01 part by weight in terms of the corresponding metal or metals per part by weight of the activated carbon. The activated carbon may further comprise an optional additional ingredient such as boric acid, phosphoric acid or their salts.

The activated carbon which has been oxidized, i.e. the oxidized activated carbon, may be obtained by oxidizing activated carbon with an oxidizing agent which may take any suitable form such as an oxidizing solution or an oxidizing gas. The oxidizing solution mentioned above may, for example, be an aqueous solution of $H_2O_2$, $HNO_3$, $K_2MnO_4$ or $NaClO_3$. While the concentration of the oxidizing agent in said oxidizing solution and the temperature of oxidation treatment vary with such factors as the type of oxidizing agent, the concentration of the oxidizing agent is usually about 1 to 20 weight percent and the temperature is usually about 10° C. to about 80° C. Specific treating procedures are optional and include, for example, the procedure of immersing the activated carbon in said solution and, then, drying the same or the procedure of spraying the activated carbon with said solution and, then, drying it. The crucial requirement is that the activated carbon and solution are brought into uniform contact with each other. The oxidizing gas may, for example, be $O_2$, $O_3$, $SO_3$, $SO_2$, $N_2O$, NO or $NO_2$. The oxidizing conditions are usually such that the concentration of oxidizing gas is 0.01 volume percent to 25 volume percent and the temperature is about 20° C. to about 500° C. This oxidation treatment may be preferably carried out in the concomitant presence of air, water vapor or equivalent. The specific procedure may be any of the conventional means heretofore used for solid-gas contact, such as the procedure of introducing the gas over activated carbon under agitation.

In obtaining an oxidized activated carbon which supports the above-mentioned specific element, the process for allowing the element to be deposited and the oxidation process may be performed simultaneously or carried out one after another. Thus, the above-mentioned element deposition treatment can be carried out on a previously oxidized activated carbon, and when use is made of an oxidizing solution, for instance, the element deposition treatment and oxidation treatment can be performed simultaneously. Alternatively, when an oxidizing gas is employed, the oxidation treatment can be performed after the element has been supported on the activated carbon.

In accordance with the present invention, the contact of the waste gas with such an activated carbon in the presence of gaseous ammonia should be conducted at a temperature between about 110° C. and about 350° C. At temperatures lower than about 110° C., there will be formed microfine particles of ammonium nitrate and/or ammonium nitrate, and to trap these particles, complicated operations and equipment will be required, whereas the catalytic activity of the activated carbon will be rapidly lowered at temperatures higher than about 350° C. The advantageous contact temperatures may range between about 150° C. and about 250° C. Particularly in case of a waste gas containing sulfur oxide together with nitrogen oxide, the contact at a temperature between about 180° C. and about 230° C. may give rise to the best results. The optimal space velocity (volume of the treated gas per volume of the activated carbon per hour) in this contact treatment varies with such factors as the kind of the gases, the temperature and the type of activated carbon, and generally may be chosen in a range between about 100 hr$^{-1}$ and about 100,000 hr$^{-1}$. The most advantageous space velocity lies in a range between about 500 hr$^{-1}$ and about 4,000 hr$^{-1}$. The contact of the gas with the activated carbon may be conducted in any mode of the gas-solid contact such as moving bed, fluidized bed or fixed bed system. In case of the moving bed system, the gas may flow in a parallel current, a countercurrent or cross current relative to the activated carbon.

By the above-mentioned contacting operation of the nitrogen oxide-containing gas with the activated carbon in the presence of gaseous ammonia, nitrogen oxide contained in the waste gas is substantially reduced to nitrogen which is harmless. This reduction reaction can be shown by the following reaction schemes:

$$6NO + 4NH_3 \rightarrow 5N_2 + 6H_2O \tag{1}$$

$$6NO_2 + 8NH_3 \rightarrow 7N_2 + 12H_2O \tag{2}$$

As mentioned above, the presence of oxygen in the gas to be treated results in a marked enhancement upon the reduction of nitrogen oxide to nitrogen, and this is surprising to those skilled in the art.

When the nitrogen oxide-containing waste gas also contains sulfur oxide, the latter is converted into and adsorbed as sulfuric acid and/or ammonium sulfate on the activated carbon, simultaneously with the reduction of nitrogen oxide to nitrogen. This reaction can be shown by, for example, the following reaction scheme:

$$SO_2 + \tfrac{1}{2}O_2 + nH_2O \rightarrow H_2SO_4 \cdot (n-1)H_2O^* \tag{3}$$

(The asterisk * denotes the form in which it is adsorbed on the activated carbon)

In this invention, gaseous ammonia is consumed by the reactions thereof with nitrogen oxides (1) and (2), but when an excess of gaseous ammonia is employed, the excess ammonia reacts with a portion of the sulfuric acid on the activated carbon which has been formed as the result of the reaction (3) to give ammonium sulfate as shown by the following reaction scheme:

$$H_2SO_4 \cdot (n-1)H_2O^* + 2NH_3 \rightarrow (NH_4)_2SO_4(n-1)H_2O^* \tag{4}$$

This means that the treated gas contains no gaseous ammonia and, therefore, there is no fear of secondary nuisance. This is another advantage of this invention.

In case of a waste gas containing nitrogen oxide but not containing sulfur oxide, the contact treatment can be continued with a high removal ratio of the nitrogen oxide in an exhaustible period without any regeneration operation of the activated carbon.

When the waste gas contains sulfur oxide together with nitrogen oxide, the catalytic capacity of the activated carbon is slowly lowered, as sulfuric acid and/or ammonium sulfate are adsorbed on the activated carbon through the contact treatment of a long period. But, the activated carbon whose efficiencies to remove sulfur oxide and nitrogen oxide have been reduced can regain the original efficiencies if regenerated by either washing with water or heating, and accordingly, can be used a second time for the removal of nitrogen oxide and sulfur oxide.

In conducting the regeneration of the activated carbon by aqueous washing, the water temperature may be from about 20° C. to about 90° C. and, preferably, about 40° C. to about 80° C., and the amount of water may be not less than twice and, preferably, 5 to 10 times the weight of the activated carbon. When an alkaline substance such as an alkali metal or alkaline earth metal is added to the recovered mixed solution of sulfuric acid and ammonium sulfate, gaseous ammonia is recovered and the sulfate, which is stable, is additionally obtained. It is also one of the features of this invention that the gaseous ammonia thus recovered can be reused as part of the ammonia source for the simultaneous treatment of nitrogen oxide and sulfur oxide which has hereinbefore been described. By way of illustration, if calcium oxide or calcium hydroxide is added to the mixed solution containing sulfuric acid and ammonium sulfate, there will be recovered gaseous ammonia and calcium sulfate.

In conducting the regeneration of the activated carbon by heating, the regeneration temperature is usually higher than about 250° C. and, preferably, about 350° C. to about 800° C. The regeneration time is generally not less than about 10 minutes and, preferably, 0.5 to 3 hours. The thermal regeneration may be conducted in an inert gas (e.g. nitrogen, combustion gas, etc.), water vapor or a reducing gas (e.g. carbon monoxide, hydrogen, etc.) or the like.

When an inert gas or water vapor is used as a carrier gas in the thermal regeneration process, portions of the ammonium sulfate and sulfuric acid on the activated carbon are first decomposed into sulfur trioxide, ammonia and water vapor and, ultimately, converted to sulfur dioxide, water vapor and nitrogen as shown by the following reaction scheme:

$$SO_3 + \tfrac{2}{3}NH_3 \rightarrow SO_2 + H_2O + \tfrac{1}{3}N_2 \tag{5}$$

This reaction is promoted when the activated carbon suports any of Ti, Cr, Mn, Fe, Co, Ni, Cu, V, Mo and W. The other portions of ammonium sulfate and sulfuric acid on the activated carbon are first decomposed into sulfur trioxide, ammonia and water vapor, and ultimately, the reaction of sulfur trioxide with activated carbon gives rise to sulfur dioxide and carbon dioxide gas.

These phenomena may be expressed by means of the following reaction schemes:

$$(NH_4)_2SO_4 + \tfrac{1}{2}C \rightarrow 2NH_3 + SO_2 + \tfrac{1}{2}CO_2 + H_2O \tag{6}$$

$$H_2SO_4 + \tfrac{1}{2}C \rightarrow SO_2 + \tfrac{1}{2}CO_2 + H_2O \tag{7}$$

A portion of ammonia in the reaction (6) is brought into contact with activated carbon at an elevated temperature and, accordingly, there is formed a basic compound on the surface of the activated carbon, which serves to improve the efficiencies to remove the sulfur oxide. Furthermore, in addition to the reactions (6) and (7), there takes place reaction (5) which suppresses the chemical exhaustion of the activated carbon.

When carbon monoxide is used as the regenerating gas, there take place, in addition to the reactions (5), (6) and (7), the reactions (8) and (9) so that the chemical exhaustion of the activated carbon can be further suppressed.

$$(NH_4)_2SO_4 + CO \rightarrow 2NH_3 + SO_2 + CO_2 + H_2O \tag{8}$$

$$H_2SO_4 + CO \rightarrow SO_2 + CO_2 + H_2O \tag{9}$$

Throughout the present specification as well as claims the abbreviations "mg.", "g.", "ml.", "cm.", "m.", "m².", "°C", "sec.", "min.", "hr.", "wt." and "vol." respectively refer to "milligram(s)", "gram(s)", "milliliter(s)", "centimeter(s)", "meter(s)", "square meter(s)", "degree(s) centigrade", "second(s)", "minute(s)", "hour(s)", "weight(s)" and "volume(s)" and "surface area" is that measured by Brunauer, Emett & Teller (B.E.T.) method described in e.g., "Journal of the American Chemical Society", 60, 309(1938).

The following examples are further illustrative of this invention.

EXAMPLE 1

Catalysts B through K supporting 1 wt. % (in terms of the corresponding metal) of the element listed in Table 1 on activated carbon, the carbon having a surface area of 660 m²/g. and being hereinafter referred to as catalyst A, were respectively prepared by adding to said carbon one of the aqueous solutions of the nitrates of Ti, Cr, Mn, Fe, Co, Ni and Cu or one of the aqueous solutions of the ammonium salts of V, Mo and W and calcining the resulting carbon samples in nitrogen gas stream at 400° C. for 1 hour.

Twenty ml. each of Catalysts A through K were respectively packed into quartz glass columns, 1.4 cm in diameter, and at the temperature of 110° C., 150° C. and 250° C., respectively, a mixed gas composed of 0.2 vol. % of NO, 0.3 vol. % of $NH_3$, 1.0 vol. % of $H_2O$, 5.0 vol. % of $O_2$ and 93.5 vol. % of He was passed at the space velocity of 3,000 $hr^{-1}$ (atmospheric temperature equivalent) for 10 hours. The gas samples at the inlet and outlet of each column were analyzed by the Saltzman method described in, e.g., "Analytical Chemistry", 28, 1810(1956) as well as by gas chromatography. In the Saltzman method, the total concentration of nitrogen oxides ($NO+NO_2$) in the gas was determined, and in gas chromatographic analysis (carrier gas:He-50 ml./min.; temperature—50° C.; packing—molecular sieve 5 A; column—4.0 mm. dia.×2000 mm. long) the concentrations of oxygen, nitrogen and nitrogen oxides were determined.

The concentrations of nitrogen oxide as determined by the two methods were in agreement. From the concentrations of nitrogen and nitrogen oxide as determined by gas chromatography, it was confirmed that under the experimental conditions of this example, the following reaction took place.

$$6NO + 4NH_3 \rightarrow 5N_2 + 6H_2O$$

The results of this experment on Catalysts A through K are summarized in Table 1. A control experiment was performed on alumina (Neobead D-4, manufactured by Mizusawa Chemical Industries, Ltd., Japan) and Zeolite (Molecular Sieve 5 A, manufactured by Linde Company, U.S.A.) The results are also set forth in Table 1.

Table 1

| Catalyst | Element supported | Percent removal of nitrogen oxide (%) | | |
|---|---|---|---|---|
| | | Reaction Temperature 110° C. | Reaction temperature 150° C. | Reaction temperature 250° C. |
| A | None | 38 | 44 | 78 |
| B | Ti | — | 65 | — |
| C | Cr | 55 | 70 | 95 |
| D | Mn | 50 | 67 | 88 |
| E | Fe | 52 | 67 | 90 |
| F | Co | 63 | 75 | 98 |
| G | Ni | — | 67 | — |
| H | Cu | 91 | 99 | 100 |
| I | V | 80 | 88 | 100 |
| J | Mo | — | 70 | — |
| K | W | — | 65 | — |
| Alumina (Control) | | 0 | 0 | 5 |
| Zeolite (Control) | | 0 | 0 | 7 |

Note: The symbol "—" means "not tested". This applies to all the Tables appearing hereinafter.

EXAMPLE 2

Activated carbon having a surface area of 580 m²/g. which is hereinafter referred to as Catalyst L and another activated carbon having a surface area of 840 m²/g. which is hereinafter referred to as Catalyst P were respectively impregnated with an aqueous solution of copper sulfate, ammonium vanadate or ammonium molybdate and, after evaporation to dryness, were calcined in nitrogen gas stream at 300° C. for 1 hour to obtain Catalysts M through O and Catalysts Q through S supporting 1 wt. % (in terms of the corresponding metal) of the element listed in Table 2 on Catalyst L or Catalyst P, respectively.

Twenty ml. each of Catalysts L through O and Catalysts P through S were respectively packed into columns of quartz glass, 1.4 cm. in diameter, and at the reaction temperature of 150° C., a mixed gas composed of 0.2 vol. % of NO, 0.3 vol. % of $NH_3$, 1.0 vol. % of $H_2O$, 5.0 vol. % of $O_2$ and 93.5 vol. % of $N_2$ was introduced at the space velocity of 3,000 $hr^{-1}$ (atmospheric temperature equivalent). Samples of the gas were analyzed by the Saltzman method as set forth in Example 1 and, for each catalyst, the change with time in the percent removal of nitrogen oxide was investigated.

The results are summarized in Table 2. It will be seen that the activity of the catalyst did not drop and no change in activity was encountered, either, when 0.1 vol. % of $SO_2$ had been admixed into the gas introduced. With any of the catalysts, the $SO_2$ admixed was completely removed.

Table 2

Unit: Percent removal of nitrogen oxide (%)

| | | Catalyst | | | | | | |
|---|---|---|---|---|---|---|---|---|
| Element Supported | | L None | M Cu | N V | O Mo | P None | Q Cu | R V | S Mo |
| | 1 | 40 | 95 | 80 | 75 | 35 | 98 | 75 | 75 |
| | 5 | 40 | 88 | 82 | 75 | 36 | 98 | 75 | 75 |
| | 10 | 45 | 90 | 85 | 75 | 36 | 95 | 80 | 78 |
| Reaction | 15 | 50 | 89 | 87 | 77 | 37 | 93 | 80 | 80 |
| time* | 20 | 50 | 89 | 87 | 80 | 35 | 92 | 83 | 81 |
| (hours)* | 25 | 47 | 90 | 85 | 77 | 35 | 90 | 80 | 80 |
| | 30 | 47 | 90 | 88 | 81 | 36 | 88 | 80 | — |
| | 65 | 51 | 90 | 86 | 80 | — | 90 | 80 | — |
| | 80 | 50 | 89 | 86 | 80 | — | 90 | 81 | — |
| | *95 | 50 | 88 | 85 | 80 | — | 88 | 80 | — |
| | *100 | 50 | 88 | 87 | 80 | — | 88 | 79 | — |

*(Note)
During 5 hours of each of the reaction times of 20 to 25 hours and 95 to 100 hours, 0.1 vol. % of $SO_2$ was admixed into the gas introduced.

EXAMPLE 3

Activated carbon having a surface area of 600 m²/g. which is hereinafter referred to as Catalyst T sprayed with an aqueous solution containing a varying concentration of copper sulfate or ammonium vanadate and, then, calcined in nitrogen gas stream at 400° C. to obtain Catalysts U through Z supporting various amounts of the copper or vanadium component as shown in Table 3. Twenty ml. each of Catalysts T through Z were respectively packed into columns of quartz glass, 1.4 cm. in diameter, and at the reaction temperature of 150° C., a mixed gas composed of 0.2 vol. % of NO, 0.3 vol. % of $NH_3$, 1.0 vol. % of $H_2O$, 5.0 vol. % of $O_2$ and 93.5 vol. % of He was introduced at the space velocity of 3,000 $hr^{-1}$ (atmospheric temperature equivalent) for 10 hours. Gas analyses were performed by the same procedure as described in Example 1 to determine the percent removal of nitrogen oxide with regard to each catalyst. The results are summarized in Table 3.

Table 3

| Catalyst | Element supported | Amount of supported component as metal (wt.%) | Percent removal of nitrogen oxide (%) |
|---|---|---|---|
| T | None | — | 50 |
| U | Cu | 0.1 | 78 |
| V | Cu | 0.5 | 90 |
| W | Cu | 1.0 | 98 |
| X | V | 0.1 | 75 |
| Y | V | 0.5 | 85 |
| Z | V | 1.0 | 88 |

EXAMPLE 4

To 10 kg. of finely crushed coal of 50 to 200 meshes (Tyler standard sieve) were added 2 kg. of pitch as a binder and one of the ingredients mentioned in Table 4. After admixing and compounding, the mixture was formed by pressing. The formed products were each carbonized at 600° C. and activated at 850° C. in the presence of water vapor for 4 hours, whereupon the catalysts shown in Table 4 were obtained.

By a procedure similar to that described in Example 3, 20 ml. of each catalyst was tested to determine the percent removal of nitrogen oxide. The results are summarized in Table 4.

Table 4

| Added ingredient | Metal content of catalyst (wt. %) | Surface area of catalyst (m²/g.) | Percent removal of nitrogen oxide(%) |
|---|---|---|---|
| $NH_4VO_3$ | 0.75 | 675 | 85 |
| $CuSO_4$ | 0.70 | 650 | 97 |
| $Cu(NO_3)_2$ | 0.73 | 680 | 96 |
| $Fe(NO_3)_2$ | 0.78 | 650 | 65 |
| None | — | 680 | 40 |

EXAMPLE 5

Activated carbon having a surface area of 660 m²/g. was subjected to oxidation and/or metal deposition treatment as set forth in Table 5. Twenty ml. each of the thus-obtained catalysts were packed into a quartz glass column, 1.4 cm. in diameter, and the mixed gas composed of 0.03 vol. % of NO, 0.03 vol. % of $NH_3$, 5.0 vol. % of $O_2$, 3.0 vol. % of $H_2O$ and 91.04 vol. % of $N_2$ was passed through the column at 150° C. and at the space velocity of 2000 hr$^{-1}$ (measured at 150° C.) for 10 hours. The gas samples at the inlet and outlet of the column were tested by the Saltzman method for the total concentration of nitrogen oxides. The results are given in Table 5.

Table 5

| Metal Deposition | Oxidation treatment | Sequence of treatments | Percent removal of nitrogen oxide (%) |
|---|---|---|---|
| None | None | | 32 |
| None | Oxidized with 2 wt. % $HNO_3$ (60° C., 1 hr.) | | 54 |
| None | Oxidized with 5 wt. % $H_2O_2$ (60° C., ½ hr.) | | 50 |
| None | Oxidized with 0.1 vol. % $SO_3$ (300° C., 1 hr.) | | 58 |
| None | Oxidized with 0.5 vol. % $N_2O$ (40° C., ½ hr.) | | 55 |
| None | Oxidized with air (400° C., ¼ hr.) | | 54 |
| None | Oxidized with 0.5 vol. % $O_3$ (15° C., ½ hr.) | | 55 |
| 0.1 wt.% V | None | | 67 |
| Same as above | Oxidized with 2.5 wt. % $H_2O_2$ (80° C., ½ hr.) | Oxidation and, then, V-deposition | 84 |
| Same as above | Same as above | Simultaneous oxidation and V-deposition | 81 |
| Same as above | Oxidized with 0.05 vol. % NO (200° C., 10 hrs.) | Oxidation and, then, V-deposition | 83 |
| Same as above | Same as above | V-deposition and, then, oxidation | 83 |
| 1.0 wt. % Ti | None | | 45 |
| Same as above | Oxidized with 5 wt. % $H_2O_2$ (60° C., ½ hr.) | Oxidation and, then, Ti-deposition | 75 |
| 1.0 wt. % Cr | None | | 43 |
| Same as above | Oxidized with 5 wt. % $H_2O_2$ (60° C., ½ Hr.) | Oxidation and, then, Cr-deposition | 78 |
| 1.0 wt. % Mn | None | | 45 |
| Same as above | Oxidized with 5 wt. % $H_2O_2$ (60° C., ½ hr.) | Oxidation and, then, Mn-deposition | 74 |
| 1.0 wt. % Fe | None | | 40 |
| Same as above | Oxidized with 5 wt. % $H_2O_2$ (60° C., ½ hr.) | Oxidation and, then, Fe-deposition | 75 |
| 1.0 wt. % Co | None | | 37 |
| Same as above | Oxidized with 5 wt. % $H_2O_2$ (60° C., ½ hr.) | Oxidation and, then, Co-deposition | 70 |
| 1.0 wt. % Ni | None | | 37 |
| Same as above | Oxidized with 5 wt. % $H_2O_2$ (60° C., ½ hr.) | Oxidation and, then, Ni-deposition | 73 |
| 1.0 wt. % Cu | None | | 55 |
| Same as above | Oxidized with 5 wt. % $H_2O_2$ (60° C., ½ hr.) | Oxidation and, then, Ni-deposition | 80 |
| 1.0 wt. % Mo | None | | 45 |

Table 5-continued

| Metal Deposition | Oxidation treatment | Sequence of treatments | Percent removal of nitrogen oxide (%) |
|---|---|---|---|
| Same as above | Oxidized with 5 wt. % $H_2O_2$ (60° C., ½ hr.) | Oxidation and, then, Mo-deposition | 78 |
| 1.0 wt. % W | None | | 40 |
| Same as above | Oxidized with 5 wt.% $H_2O_2$ (60° C., ½ hr.) | Oxidation and, then, W-deposition | 76 |

(Notes)
(1) In the case of oxidation with oxidizing solutions, the treatments were carried out in aqueous solutions and the amount of each oxidizing aqueous solution used was 10 times the weight of activated carbon.
(2) In the case of oxidation with oxidizing gases, the treatments were carried out in air laden with 3 vol. % of moisture and the space velocity (atmospheric temperature equivalent) of each oxidizing gas was 1,000 $hr^{-1}$.

EXAMPLE 6

To activated carbon having a surface area of 760 $m^2/g$. which is hereinafter referred to as Catalyst a was added an aqueous solution of the nitrate of Ti, Cr, Mn, Fe, Co, Ni or Cu, an aqueous solution of the ammonium salt of V, W or Mo or a mixed aqueous solution of ammonium vanadate and either phosphoric acid or boric acid. After evaporation to dryness, the carbon is calcined in nitrogen gas stream at 350° C. for 1 hour, whereby Catalysts b through m listed in Table 6 were obtained. The amount of deposition of each metal component on activated carbon was 0.5 wt. % in terms of the corresponding metal. The amount of deposition of phosphoric acid or boric acid was 0.5 wt. %

Twenty ml. each of the metal-supporting activated carbon Catalysts b through m and Catalyst a were respectively packed into columns of quartz glass, 1.5 cm. in diameter, and at the temperature of 200° C., $N_2$ gas containing 0.03 vol. % of NO, 0.03 vol. % of $NH_3$, 0.06 vol. % of $SO_2$, 6.0 vol. % of $O_2$ and 10.0 vol. % of $H_2O$ was introduced at the space velocity of 1,000 $hr^{-1}$ (atmospheric temperature equivalent). The gas samples taken at the inlet and outlet of the column were analyzed by the Saltzman method as set forth in Example 1 for the total concentration of nitrogen oxides, by the iodimetry method as described in Japan Industrial Standard K 0103 (1971) for the concentration of $SO_2$, and by the indophenol method as described in Japan Industrial Standard K 0099 (1969) for the concentration of $NH_3$, respectively, and the percent removal of nitrogen oxide and of sulfur oxide at a timed interval was determined. The results are summarized in Table 6.

Table 6

| | | Percent removal of nitrogen oxide ($NO_x$) and sulfur oxide ($SO_2$) at a varying time (%) | | | | | |
|---|---|---|---|---|---|---|---|
| | | 6 hrs. | | 24 hrs. | | 48 hrs. | |
| Catalyst | Element Supported | $NO_x$ | $SO_2$ | $NO_x$ | $SO_2$ | $NO_x$ | $SO_2$ |
| a | None | 43 | 70 | 60 | 70 | 40 | 62 |
| b | Ti | 70 | 75 | 73 | 75 | 60 | 65 |
| c | Cr | 70 | 70 | 70 | 68 | — | — |
| d | Mn | 78 | 70 | 78 | 67 | — | — |
| e | Fe | 80 | 75 | 83 | 75 | 75 | 70 |
| f | Co | 80 | 77 | 80 | 75 | — | — |
| g | Ni | 70 | 75 | 70 | 70 | 65 | 65 |
| h | Cu | 80 | 80 | 82 | 75 | 73 | 73 |
| i | V | 85 | 80 | 85 | 75 | 80 | 70 |
| j | Mo | 73 | 75 | 75 | 68 | 63 | 65 |
| k | W | 75 | 70 | 78 | 65 | 60 | 60 |
| l | V—$H_3PO_4$ | 89 | 80 | 90 | 80 | 78 | 75 |
| m | V—$H_3BO_3$ | 87 | 80 | 89 | 80 | 78 | 76 |

For all catalysts, the concentrations of ammonia in the gases emerging from the outlet of the column were not more than 1 ppm irrespective of reaction time.

After the simultaneous removal of nitrogen oxide and sulfur oxide from the gas has been conducted for 48 hours, the reaction column was heated to 350° C. while $N_2$ gas was passed through the column at the space velocity of 100 $hr^{-1}$ (atmospheric temperature equivalent). Thus, the catalyst was regenerated at 350° C. for 30 minutes. The gas emerging from the catalyst bed was guided into a 5 wt.% aqueous solution of $H_2O_2$ so as to absorb the $NH_3$, $SO_2$ and $SO_3$.

Following the thermal regeneration of the catalyst, the above-mentioned substrate gas was introduced under precisely the same conditions as above and the percent removal of nitrogen oxide and of sulfur oxide at a varying time interval was determined. The results are set forth in Table 7. Comparison of Tables 6 and 7 will reveal that the thermal regeneration of the catalyst restores its efficiencies to remove nitrogen oxide and sulfur oxide and improves the performance of the catalyst.

In connection with the removal of nitrogen oxide and sulfur oxide with the thermally regenerated catalysts, the concentrations of ammonia in the gases at column outlets were not more than 1 ppm for all catalysts.

Table 7

| | Percent removal of nitrogen oxide ($NO_x$) and of sulfur oxide ($SO_2$) at a varying time with thermally Regererated catalyst (%) | | | | | |
|---|---|---|---|---|---|---|
| | 6 hrs. | | 24 hrs. | | 48 hrs. | |
| Catalyst | $NO_x$ | $SO_2$ | $NO_x$ | $SO_2$ | $NO_x$ | $SO_2$ |
| a | 80 | 75 | 68 | 70 | 55 | 65 |
| b | 100 | 90 | 90 | 90 | 69 | 85 |
| c | 100 | 88 | 85 | 85 | 65 | 80 |
| d | 100 | 89 | 85 | 87 | 75 | 81 |
| e | 100 | 85 | 80 | 80 | 65 | 75 |
| f | 100 | 88 | 78 | 80 | 70 | 78 |
| g | 100 | 80 | 85 | 80 | 65 | 65 |
| h | 100 | 85 | 88 | 75 | 78 | 70 |
| i | 100 | 98 | 90 | 95 | 80 | 95 |
| j | 100 | 90 | 79 | 75 | 65 | 78 |
| k | 100 | 85 | 75 | 78 | 68 | 75 |
| l | 100 | 98 | 93 | 90 | 85 | 90 |
| m | 100 | 95 | 90 | 90 | 82 | 91 |

EXAMPLE 7

For the Catalysts a and i of Example 6, the same mixed gas composed of NO—$NH_3$—$SO_2$—$O_2$—$H_2O$—$N_2$ was passed through each catalyst bed for 48 hours under precisely the same conditions as in Example 6. Then, each column was cooled to 80° C. and a two-way cock was attached to the bottom of the column. The column was maintained at a constant temperature of 80° C. Then, 15 ml. of warm water at 80° C. was run down the column to allow the water to contact with the catalyst for about 1 hour. The bottom cock was opened to withdraw the extract and the cock was closed. Then, 15 ml. of warm water at 80° C. was passed down the column. After 1 hour of contact, the extract was withdrawn from the column. This operation was repeated for a total of 5 times, after which dry air at 110° C. was passed through the column for 3 hours to dry the catalyst. Then, in the same manner as Example 6, the same mixed gas composed of $NO-NH_3-SO_2-O_2-H_2O-N_2$ was introduced and the percent removal of nitrogen oxide and sulfur oxide by the aqueous-regenerated catalyst at a varying time was determined. The results are set forth in Table 8. The concentrations of ammonia in the gases at the column outlets were not more than 1 ppm in all cases of simultaneous removal of nitrogen oxide and sulfur oxide.

The liquid recovered by the above aqueous washing of the catalyst was a mixed solution of sulfuric acid and ammonium sulfate. When a slight excess of an aqueous solution of NaOH was added to this solution and the resultant mixture was heated to 80° C., the ammonia of the ammonium sulfate was recovered in gaseous form and $Na_2SO_4$ was also formed within the solution.

Table 8

Percent removal of nitrogen oxide ($NO_x$) and of sulfur oxide ($SO_x$) at a varying time with aqueous-regenerated catalyst (%)

| Catalyst | 6 hrs. | | 24 hrs. | | 48 hrs. | |
|---|---|---|---|---|---|---|
| | $NO_x$ | $SO_2$ | $NO_x$ | $SO_2$ | $NO_x$ | $SO_2$ |
| a | 83 | 75 | 67 | 68 | 55 | 63 |
| 1 | 100 | 96 | 93 | 93 | 77 | 93 |

What is claimed is:

1. A process for treating a waste gas, which consists essentially of the steps of contacting a nitrogen oxide-containing waste gas with activated carbon as the sole catalyst in the presence of gaseous ammonia and oxygen at a temperature between about 150° C. and about 250° C. to convert the nitrogen oxide to nitrogen, whereby the nitrogen oxide is removed from said waste gas, said gaseous ammonia being present in amounts not less than $\frac{2}{3}$ mole per mole, in terms of NO, of the nitrogen oxide contained in the waste gas and wherein the oxygen is present in an amount of not less than 0.5 mole per mole, in terms of NO, of the nitrogen oxide contained in the waste gas.

2. The process of claim 1, wherein the activated carbon is oxidized activated carbon.

3. The process of claim 2, wherein the oxidized activated carbon is one prepared by oxidizing an activated carbon with an oxidizing solution selected from the group consisting of $H_2O_2$, $HNO_3$, $K_2MnO_4$ or $NaClO_3$.

4. The process of claim 2, wherein the oxidized activated carbon is one prepared by oxidizing an activated carbon with an oxidizing gas selected from the group consisting of $O_2$, $O_3$, $SO_3$, $SO_2$, $N_3O$, NO or $NO_2$ gas.

* * * * *